United States Patent
Hirao

(10) Patent No.: US 9,905,364 B2
(45) Date of Patent: Feb. 27, 2018

(54) MULTILAYER CERAMIC ELECTRONIC COMPONENT AND METHOD FOR MANUFACTURING MULTILAYER CERAMIC ELECTRONIC COMPONENT

(71) Applicant: Murata Manufacturing Co., Ltd., Nagaokakyo-shi, Kyoto-fu (JP)

(72) Inventor: Takahiro Hirao, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 24 days.

(21) Appl. No.: 14/744,333

(22) Filed: Jun. 19, 2015

(65) Prior Publication Data
US 2016/0020029 A1    Jan. 21, 2016

Related U.S. Application Data

(63) Continuation of application No. PCT/JP2013/084588, filed on Dec. 25, 2013.

(30) Foreign Application Priority Data

Dec. 28, 2012    (JP) .................................. 2012-286814

(51) Int. Cl.
*H01G 4/005*    (2006.01)
*H01G 4/30*    (2006.01)
(Continued)

(52) U.S. Cl.
CPC ........... *H01G 4/306* (2013.01); *H01G 4/0085* (2013.01); *H01G 4/012* (2013.01); *H01G 4/232* (2013.01); *H01G 4/30* (2013.01); *H01G 4/12* (2013.01)

(58) Field of Classification Search
CPC .......... H01G 4/228; H01G 4/12; H01G 4/232; H01G 4/30; H01G 4/005; H01G 4/10; H01G 4/248
See application file for complete search history.

(56) References Cited

U.S. PATENT DOCUMENTS 7,329,976 B2 *   2/2008   Shirasu ................. H01G 4/012
                                                                          310/365
2006/0215349 A1   9/2006   Lee et al.
(Continued)

FOREIGN PATENT DOCUMENTS

CN    1838350 A    9/2006
JP    62-94620 U    6/1987
(Continued)

OTHER PUBLICATIONS

Official Communication issued in corresponding Japanese Patent Application No. 2014-554476, dated Aug. 23, 2016.
(Continued)

*Primary Examiner* — Nguyen Ha
(74) *Attorney, Agent, or Firm* — Keating & Bennett, LLP

(57) ABSTRACT

A multilayer ceramic electronic component includes a multilayer body including ceramic layers and inner electrode layers, the inner electrode layers being disposed on interfaces between the ceramic layers, and an outer electrode on an external surface of the multilayer body and electrically connected to first end portions of the inner electrode layers exposed to the external surface of the multilayer body. Each of the ceramic layers includes a thin portion with a continuously reducing thickness near the first end portion. Each inner electrode layer includes a thick portion near a connection with the outer electrode, the thick portion having a thickness continuously increasing toward the connection on a first side in accordance with a shape of the thin portion in the ceramic layer. A distance between a second end portion in the inner electrode layer not joined to the outer electrode, and the thick portion adjacent to the second end portion is equal to or longer than an interlayer distance between the inner electrode layers.

14 Claims, 7 Drawing Sheets

(51) Int. Cl.
*H01G 4/232* (2006.01)
*H01G 4/012* (2006.01)
*H01G 4/008* (2006.01)
H01G 4/12 (2006.01)

(56) References Cited

U.S. PATENT DOCUMENTS

| | | |
|---|---|---|
| 2006/0245141 A1 | 11/2006 | Shirasu et al. |
| 2010/0008017 A1 | 1/2010 | Ito et al. |
| 2011/0141656 A1* | 6/2011 | Yun .................. H01G 4/005 |
| | | 361/303 |

FOREIGN PATENT DOCUMENTS

| | | |
|---|---|---|
| JP | 5-335175 A | 12/1993 |
| JP | 09-266131 A | 10/1997 |
| JP | 10-50548 A | 2/1998 |
| JP | 10-097942 A | 4/1998 |
| JP | 2004-014634 A | 1/2004 |
| JP | 2004-228468 A | 8/2004 |
| JP | 2006-332601 A | 12/2006 |
| JP | 2010-41030 A | 2/2010 |
| WO | 2010/035461 A1 | 4/2010 |

OTHER PUBLICATIONS

Official Communication issued in International Patent Application No. PCT/JP2013/084588, dated Feb. 4, 2014.
Official Communication issued in corresponding Japanese Patent Application No. 2014-554476, dated Mar. 7, 2017.

* cited by examiner

MULTILAYER CERAMIC ELECTRONIC COMPONENT AND METHOD FOR MANUFACTURING MULTILAYER CERAMIC ELECTRONIC COMPONENT

BACKGROUND OF THE INVENTION

1. Field of the Invention

The present invention relates to a multilayer ceramic electronic component, such as a multilayer ceramic capacitor, and a method for manufacturing the multilayer ceramic electronic component. In particular, the present invention relates to a multilayer ceramic electronic component in which, even when laminated inner electrode layers and/or ceramic layers are thin films, the inner electrode layers are electrically connected to an outer electrode with reliability, and also the present invention relates to a method for manufacturing the multilayer ceramic electronic component.

2. Description of the Related Art

In recent years, further reduction in the size and the height profile of a multilayer ceramic electronic component, such as a multilayer ceramic capacitor, has been required. Thus, it is necessary to further reduce the thickness of an inner electrode, the thickness of a ceramic layer between the inner electrodes, and the like.

A known method for manufacturing a multilayer ceramic electronic component is described below. First, desired patterns of conductive paste containing nickel powder and the like are printed on ceramic green sheets. The plurality of ceramic green sheets with printed patterns of conductive paste are laminated to produce a laminated structure, a ceramic green sheet without conductive paste is laminated on each of a top and a bottom of the laminated structure, and thus a multilayer body is produced. After the produced multilayer body is pressed in the thickness direction, it is fired, and a ceramic sinter is thus obtained. Then, an outer electrode is formed on each of both end surfaces of the ceramic sinter, and a multilayer ceramic electronic component is thus obtained.

A known method for manufacturing a multilayer ceramic electronic component is also disclosed in Japanese Unexamined Patent Application Publication No. 2004-014634. FIG. 7 is a cross-sectional view that schematically illustrates a configuration of a multilayer ceramic electronic component manufactured by the known manufacturing method. As illustrated in FIG. 7, outer electrodes 3 and 4 are formed on both end surfaces of a ceramic sinter 2. Inner electrodes 5 made of conductive paste containing, for example, nickel powder, are arranged in the ceramic sinter 2 such that they overlap each other with ceramic layers disposed therebetween.

In the method for manufacturing the multilayer ceramic electronic component disclosed in Japanese Unexamined Patent Application Publication No. 2004-014634, the inner electrodes are exposed to the end surfaces of the ceramic sinter by oxidizing and expanding the inner electrodes in firing the multilayer body. However, it is difficult to adjust the degree of oxidation and expansion. In addition, because the inner electrodes and the ceramic layers have different shrinkage ratios in firing and typically the shrinkage ratio in the inner electrodes is large, the inner electrodes may be shrunken in directions separated from the end surface of the ceramic sinter by firing. In particular, when the inner electrodes are thin, they become separated more easily from the end surfaces of the ceramic sinter, and a problem arises in that it is difficult to ensure electrical connection with the outer electrodes.

That is, if the inner electrodes significantly shrink in directions separated from the end surfaces of the ceramic sinter, even when the end surface of the ceramic sinter are both polished by barrel polishing, for example, the inner electrodes may not be exposed through the end surfaces of the ceramic sinter. In such a case, it is impossible to ensure electrical connection between the inner electrodes and the outer electrodes.

SUMMARY OF THE INVENTION

In the light of the above circumstances, preferred embodiments of the present invention provide a multilayer ceramic electronic component in which, even when laminated inner electrode layers and/or ceramic layers are thin films, the inner electrode layers and an outer electrode are electrically connected to each other with reliability, and a method for manufacturing the multilayer ceramic electronic component.

A multilayer ceramic electronic component according to a preferred embodiment of the present invention includes a multilayer body in which a plurality of ceramic layers and a plurality of inner electrode layers are laminated, the plurality of inner electrode layers being disposed on a plurality of interfaces between the ceramic layers, and an outer electrode disposed on an external surface of the multilayer body and electrically connected to first end portions in the inner electrode layers, the first end portions being exposed to the external surface of the multilayer body. Each of the ceramic layers includes a thin portion whose thickness in a vicinity of the first end portion continuously reduces toward the first end portion. Each of the inner electrode layers includes a thick portion in a vicinity of connection with the outer electrode, the thick portion having a thickness that continuously increases toward the connection on a first side in accordance with a shape of the thin portion in the ceramic layer. A distance between a second end portion in the inner electrode layer, the second end portion not being joined to the outer electrode, and the thick portion adjacent to the second end portion is equal to or longer than an interlayer distance between the inner electrode layers.

In the above-described configuration, in accordance with the thin portion whose thickness in the vicinity of the first end portion continuously reduces toward the first end portion included in each of the ceramic layers, each of the inner electrode layers includes the thick portion in the vicinity of the connection with the outer electrode, the thick portion having the thickness continuously increasing toward the connection on the first side. Accordingly, because the area of the connection between the outer electrode and the inner electrode layers is large, even when the inner electrode layers are thin films, the inner electrode layers and the outer electrode are electrically connected to each other with reliability. If a thick portion is simply provided in each of the inner electrode layer in the vicinity of the connection with the outer electrode, the distance between a second end portion that is not joined to the outer electrode and the thick portion in the inner electrode layer adjacent thereto may be equal to or shorter than the interlayer distance between the inner electrode layers, as indicated in a drawing illustrated below. In that case, an electric field may concentrate in the second end portion in the inner electrode and the amount of electric discharge may increase. In contrast, in the above-described configuration, because the distance between the second end portion, which is not joined to the outer electrode, and the thick portion in the adjacent inner electrode layer is equal to or longer than the interlayer distance between the inner electrode layers, the occurrence of concentration of an electric field in the second end portion in the inner electrode layer is significantly reduced, and the possibility of increasing the amount of electric discharge is prevented. Accordingly, a highly reliable multilayer ceramic electronic component in which the occurrence of troubles caused by electric discharge is significantly is provided.

The thickness in the ceramic layer continuously reducing toward the first end portion means that there is no portion whose thickness increases or no portion whose thickness intermittently changes in a macroscopic shape, except that the thickness of a minute region increases or decreases. The thickness in the inner electrode layer continuously increasing on the first side in accordance with the shape of the ceramic layer means that the thickness continuously increases on the first side while the inner electrode layer traces changes in the thickness of the ceramic layer. The flatness of the top surface of the inner electrode layer located on the ceramic layer illustrated in a diagram illustrated below is optional, and the top surface may have a slightly different shape within a range where the above-described advantages are obtainable.

In the multilayer ceramic electronic component according to a preferred embodiment of the present invention, the outer electrode may preferably be integral with the inner electrode layers such that the thick portions exposed to the external surface of the multilayer body in the plurality of inner electrode layers are united together.

In the above-described configuration, because the outer electrode is integral with the inner electrode layers, even if the inner electrode layers are shrunken by firing, the multilayer ceramic electronic component is the one in which they are electrically connected to the outer electrode with reliability.

A method for manufacturing a multilayer ceramic electronic component according to yet another a preferred embodiment of the present invention is provided. The multilayer ceramic electronic component includes a multilayer body in which a plurality of ceramic layers and a plurality of inner electrode layers are laminated, the plurality of inner electrode layers being disposed on a plurality of interfaces among interfaces between the ceramic layers, and an outer electrode disposed on an external surface of the multilayer body and electrically connected to first end portions in the inner electrode layers, the first end portions being exposed to the external surface of the multilayer body. The method includes a step of forming each of the ceramic layers such that the ceramic layer includes a thin portion whose thickness in a vicinity of the first end portion continuously reduces toward the first end portion, a step of forming each of the inner electrode layers on the ceramic layers such that the inner electrode layer includes a thick portion that covers the thin portion, which is formed in the vicinity of the first end portion, in the ceramic layer and that has a thickness continuously increasing toward a first side in accordance with a shape of the thin portion, a step of producing the multilayer body by alternately laminating the ceramic layers and the inner electrode layers such that the thick portions in the inner electrode layers are exposed to the external surface and a distance between a second end portion in each of the inner electrode layers and the thick portion adjacent to the second end portion is equal to or longer than an interlayer distance between the inner electrode layers, and a step of forming the outer electrode to be electrically connected to the thick portions in the inner electrode layers, the thick portions being exposed to the external surface of the multilayer body.

In the above-described configuration, the highly reliable multilayer ceramic electronic component in which the occurrence of troubles caused by electric discharge is significantly reduced is thus manufactured.

In the method for manufacturing the multilayer ceramic electronic component according to a preferred embodiment of the present invention, the outer electrode may preferably be formed as the thick portions in the plurality of inner electrode layers in the step of forming the outer electrode, the thick portions being united together by uniting redundant portions in the inner electrode layers together in the step of producing the multilayer body, each of the redundant portions being formed in the step of forming each of the inner electrode layers such that the redundant portion extends over the first end portion in the ceramic layer.

In the above-described configuration, the use of the united portions in the inner electrode layers as the outer electrode eliminates a step of newly forming the outer electrode.

In the method for manufacturing the multilayer ceramic electronic component according to a preferred embodiment of the present invention, the ceramic layers and the inner electrode layers may preferably be formed by an inkjet technique.

In the above-described configuration, ceramic ink layers or electrode ink layers are laminated by the inkjet technique. Thus, each of the ceramic layers is formed such that it includes the thin portion whose thickness in the vicinity of the first end portion continuously reduces, and each of the inner electrode layers is formed such that it includes the thick portion in the vicinity of the connection with the outer electrode, the thick portion having the thickness that continuously increases toward the connection on the first side in accordance with the shape of the thin portion in the ceramic layer.

According to the above-described configuration, by forming the ceramic layer such that it includes the thin portion whose thickness in the vicinity of the first end portion continuously reduces toward the first end portion, the inner electrode layer is formed such that it includes the thick portion in the vicinity of the connection with the outer electrode, the thick portion having the thickness that continuously increases toward the connection on the first side in accordance with the shape of the thin portion in the ceramic layer. Accordingly, because the area of the connection between the outer electrode and the inner electrode layers is large, even when the inner electrode layers are formed as thin films, the inner electrode layers and the outer electrode are electrically connected to each other with reliability. In addition, because the distance between the second end portion in each of the inner electrode layers, the second end portion being not joined to the outer electrode, and the thick portion in the inner electrode layer adjacent thereto is equal to or longer than the interlayer distance between the inner electrode layers, the occurrence of concentration of an electric field in the second end portion in the inner electrode layer is reduced, and the possibility of increasing the amount of electric discharge is prevented. Accordingly, a highly reliable multilayer ceramic electronic component in which the occurrence of troubles caused by electric discharge is significantly reduced is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A multilayer ceramic electronic component and a method for manufacturing the multilayer ceramic electronic component according to preferred embodiments of the present invention are specifically described below with reference to the drawings. The preferred embodiments described below are not intended to limit the invention described in the claims, and not all of combinations of characteristics described in the preferred embodiments are required for the solutions.

First Preferred Embodiment

Figure 1:
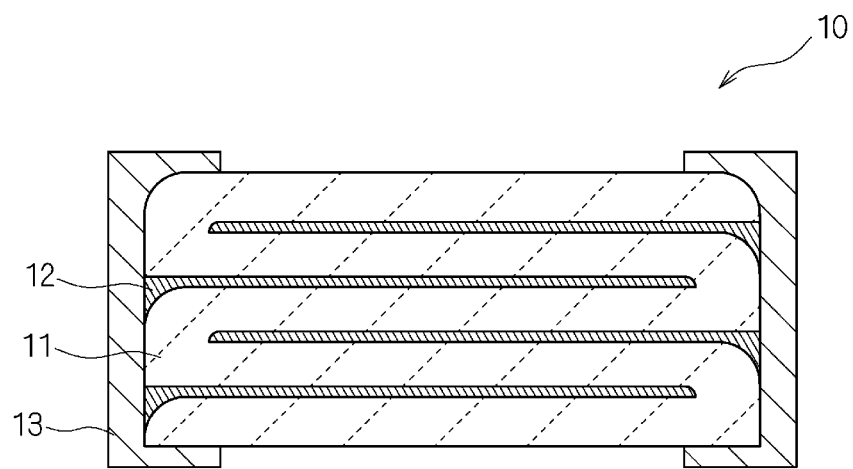
FIG. 1 is a cross-sectional view that illustrates a configuration of a multilayer ceramic electronic component according to a first preferred embodiment of the present invention.
Figure 2A:
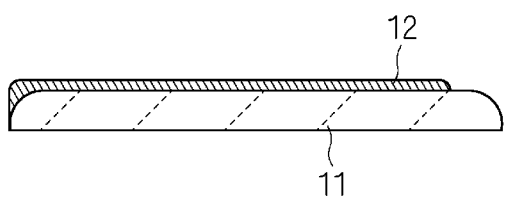
FIGS. 2A-2C are diagrams that schematically illustrate a process for manufacturing the multilayer ceramic electronic component according to the first preferred embodiment of the present invention.
Figure 2B:
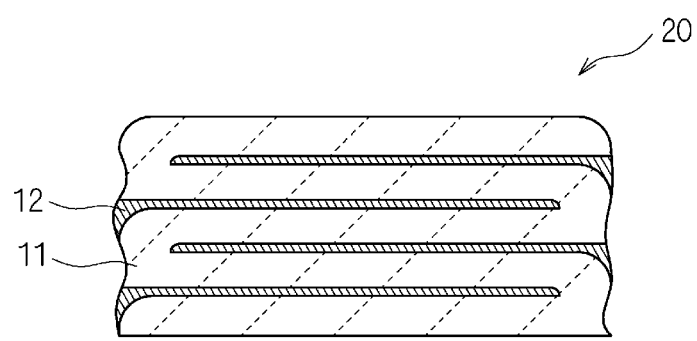
Figure 2C:
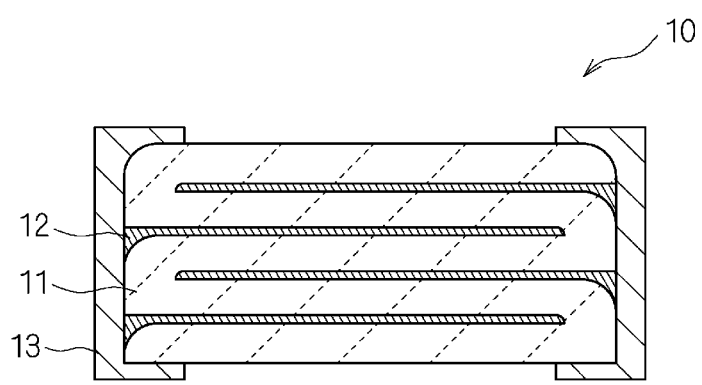

FIG. 1 is a cross-sectional view that illustrates a configuration of a multilayer ceramic electronic component according to a first preferred embodiment of the present invention. As illustrated in FIG. 1, ceramic layers 11 and inner electrode layers 12 are alternately laminated in a multilayer ceramic electronic component 10 according to the present first preferred embodiment, and an outer electrode 13 is disposed on both side surfaces thereof. The multilayer ceramic electronic component 10 according to the present first preferred embodiment has a characteristic in that each of the ceramic layer 11 includes a thin portion whose thickness continuously reduces in the vicinity of a first end portion. FIGS. 2A-2C are diagrams that schematically illustrate a method for manufacturing the multilayer ceramic electronic component 10 according to the first preferred embodiment of the present invention.

As illustrated in FIG. 2A, first, the ceramic layer 11 is formed such that it includes a thin portion whose thickness continuously reduces in the vicinity of a first end portion. Specifically, ceramic ink with relatively low viscosity is applied on a substrate (base), which is described below, it is dried, and thus the ceramic layer 11 is formed. In FIG. 2A, the ceramic layer 11 includes thin portions in the vicinity of both end portions. To increase the thickness of the ceramic layer 11, the ceramic ink may be applied multiple times in forming the ceramic layer 11. In the case of applying the ceramic ink multiple times, the ceramic ink may be dried each time or may be successively applied multiple times without being dried.

The ceramic layer 11 includes the thin portions whose thicknesses are continuously reduced by surface tension of the ceramic ink in both end portions. Because the viscosity of the ceramic ink is relatively low, the coffee ring effect, in which a density difference occurs between the perimeter and the center during drying the ceramic ink, causes the ceramic ink to move toward the perimeter, and thus, the perimeter portion in the ceramic layer 11 tends to be thick portions. Of course, the thin portions may be formed by adjusting the thickness in printing, such as reducing the amount of discharging the ink from the central portion toward the perimeter portion in discharging and applying the ceramic ink.

Figure 3:
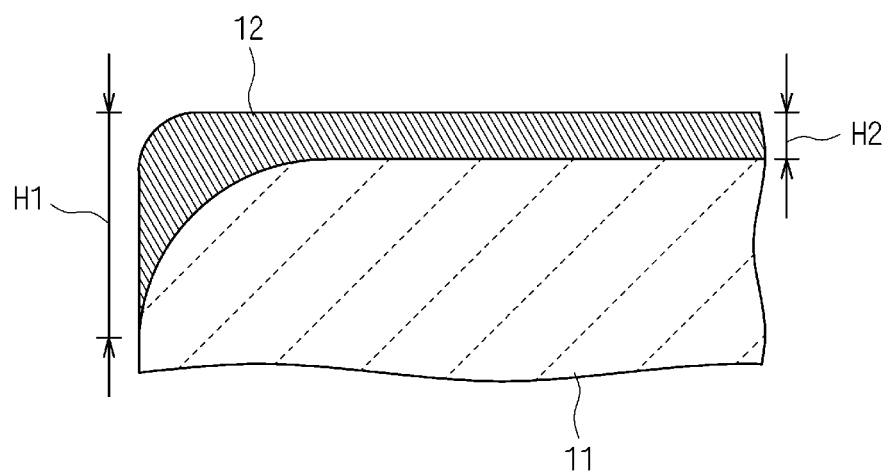
FIG. 3 is a partial cross-sectional view that illustrates a state when an inner electrode layer is formed in the multilayer ceramic electronic component according to the first preferred embodiment of the present invention.

The inner electrode layer 12 is formed on the ceramic layer 11 using conductive ink. FIG. 3 is a partial cross-sectional view that illustrates a state when the inner electrode layer 12 is formed in the multilayer ceramic electronic component 10 according to the first preferred embodiment of the present invention.

As illustrated in FIG. 3, by discharging and applying the conductive ink such that it covers the thin portion formed in the vicinity of the first end portion in the ceramic layer 11, the thickness of the inner electrode layer 12 continuously increases on the first side in accordance with the shape of the thin portion in the ceramic layer 11. That is, the inner electrode layer 12 includes a thick portion having a thickness H1 in the end portion, the thickness H1 being larger than a thickness H2 in the vicinity of the central portion.

The thickness H1 is determined by, in a cross section of the inner electrode layer 12 obtained by polishing the inner electrode layer 12 being in an embedded state in which the ceramic layer 11 with the inner electrode layer 12 being formed thereon is embedded in resin up to the central portion in the widthwise direction of the inner electrode layer 12, observing and measuring the end-portion thickness defined as the gap between the top surface of the inner electrode layer 12 and the position of the boundary between the ceramic layer 11 and the inner electrode layer 12 in the end portion by using a SEM or the like. The thickness H2 is determined as a mean value of values obtained by, in the cross section of the inner electrode layer 12, observing and measuring the thickness in the vicinity of the central portion defied as the gap between the top surface of the ceramic layer 11 and the top surface of the inner electrode layer 12 in the vicinity of the central portion in the inner electrode layer 12 by using a SEM or the like at a plurality of points (for example, about 10 points).

Referring back to FIGS. 2A-2C, as illustrated in FIG. 2A, the inner electrode layer 12 is formed by applying the conductive ink on a first end portion side of the inner electrode layer 12 such that it covers the thin portion in the ceramic layer 11, applying the conductive ink on a second end portion side of the inner electrode layer 12 up to a position that does not reach the end portion in the ceramic layer 11, and drying the conductive ink. To increase the thickness of the inner electrode layer 12, the conductive ink may be applied multiple times in forming the inner electrode layer 12. By repeatedly laminating the ceramic layers 11 and the inner electrode layers 12 such that the first end portion sides and the second end portion sides of the inner electrode layers 12 are arranged alternately, an unfired multilayer body (green chip) 20 illustrated in FIG. 2B is formed. Because the thickness of each of the inner electrode layers 12 on the first end portion side continuously increases toward the external surface of the multilayer body, the inner electrode layers 12 are exposed to the external surface of the multilayer body 20 with greatly improved reliability.

Then the unfired multilayer body 20 is fired. Because each of the inner electrode layers 12 includes the thick portion, which has the thickness that continuously increases toward the external surface of the multilayer body 20, even if the inner electrode layer 12 is shrunken by firing, the inner electrode layer 12 does not easily recede from the external surface of the multilayer body 20. Accordingly, the occurrence of shielding the inner electrode layer 12 by the ceramic layer 11 is significantly reduced or prevented, and the inner electrode layer 12 is electrically connected to the outer electrode 13 with reliability. Firing the multilayer body 20 is optional.

As illustrated in FIG. 2C, the multilayer ceramic electronic component 10 is manufactured by disposing the outer electrode 13 electrically connected to the inner electrode layers 12 on the external surface of the fired multilayer body 20 with the exposed inner electrode layers 12. In the present first preferred embodiment, the connection between the inner electrode layers 12 and the outer electrode 13 preferably has a relatively large area.

Figure 4A:
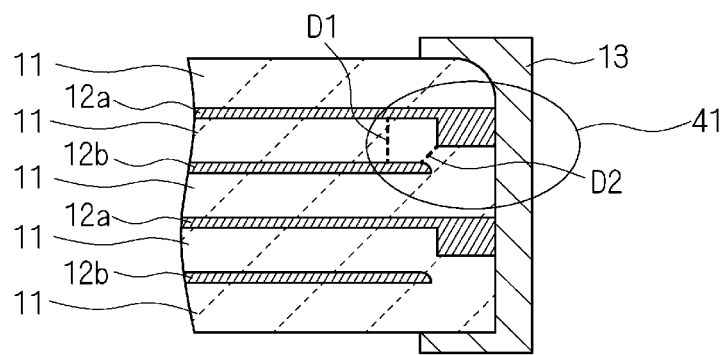
FIGS. 4A and 4B are partial cross-sectional views that illustrate an end portion in the multilayer ceramic electronic component according to the first preferred embodiment of the present invention.
Figure 4B:
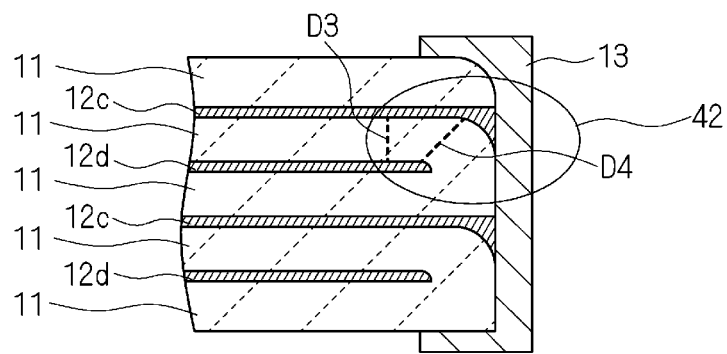

FIGS. 4A and 4B are partial cross-sectional views that illustrate an end portion in the multilayer ceramic electronic component 10 according to the first preferred embodiment of the present invention. FIG. 4A is a partial cross-sectional view of the multilayer ceramic electronic component when the inner electrode layer 12 has a thickness that increases toward the external surface of the multilayer body 20 such that the increase is not continuously uniform but steep at a point. FIG. 4B is a partial cross-sectional view of the multilayer ceramic electronic component 10 when the inner electrode layer 12 has a thickness that continuously increases toward the external surface of the multilayer body 20, as in the present first preferred embodiment.

FIG. 4A illustrates an example case where the area of the connection between the inner electrode layer 12 and the outer electrode 13 is increased by steeply increasing the thickness of the inner electrode layer 12 at a point without continuously increasing it. In this case, there may be a portion where a distance D2 between an unexposed end portion in an inner electrode layer 12a and an adjacent inner electrode layer 12b is smaller than an interlayer distance D1 between the inner electrode layers 12a and 12b. Thus, in an end portion 41, an electric field may concentrate in the portion where the distance D2 is smaller than the interlayer distance D1 between the inner electrode layers 12a and 12b, and the amount of electric discharge may increase.

In contrast, in the multilayer ceramic electronic component 10 according to the present first preferred embodiment, as illustrated in FIG. 4B, the shape of the thin portion formed in the vicinity of the first end portion in the ceramic layer 11 and the position of an unexposed end portion in an inner electrode layer 12c are appropriately designed. That is, a distance D4 between the unexposed end portion in the inner electrode layer 12c and an adjacent inner electrode layer 12d is equal to or longer than an interlayer distance D3 between the inner electrode layers 12c and 12d. This significantly reduces or prevents the occurrence of concentration of an electric field in an end portion 42 and also prevents the possibility of increasing the amount of electric discharge.

The above-described thicknesses D1 to D4 are determined by, in a cross section of the multilayer ceramic electronic component 10 obtained by polishing the multilayer ceramic electronic component 10 being in an embedded state in which the multilayer ceramic electronic component 10 is embedded in resin up to the central portion in the widthwise direction of the inner electrode layers 12, observing and measuring the interlayer distance D3 (D1) between the inner electrode layers 12c and 12d (12a and 12b) and the shortest distance D4 (D2) between the end portion (near the junction with the outer electrode 13) in the inner electrode layer 12c (12a) and the adjacent inner electrode layer 12d (12b) by using a SEM or the like. The interlayer distance D3 (D1) is a minimum value of values measured at a plurality of points (for example, about 10 points). The shortest distance D4 between the end portion in the inner electrode layer 12c and the adjacent inner electrode layer 12d is also determined to be equal to or longer than the interlayer distance D3 between the inner electrode layers 12c and 12d at a plurality of points (for example, about 10 points).

To achieve the advantages of preferred embodiments of the present invention, it is necessary to make the distance D4 equal to or longer than the distance D3 in at least one inner electrode layer 12c over the entire region of the multilayer ceramic electronic component 10. The achievement of the advantages of preferred embodiments of the present invention can be determined by observing and measuring the distances in a cross section in a central portion unless a partially different structure is adopted in designing the multilayer ceramic electronic component 10.

Figure 5:
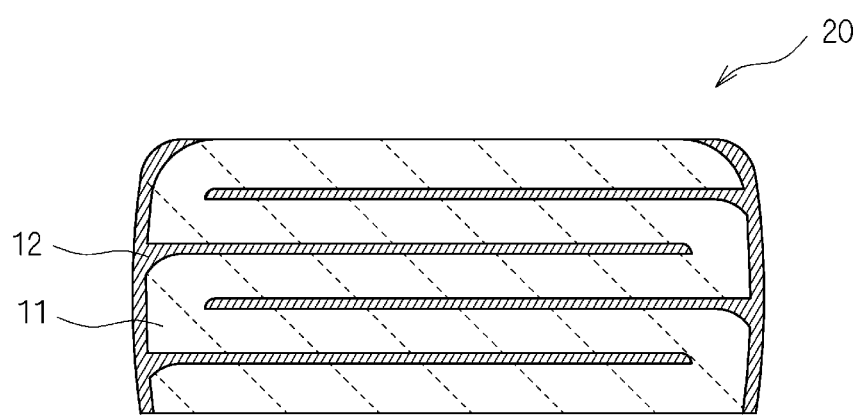
FIG. 5 is a cross-sectional view that illustrates a configuration of a multilayer body in the multilayer ceramic electronic component according to the first preferred embodiment of the present invention.

The inner electrode layers 12 exposed to the external surface of the multilayer body 20 may be united and integrated with each other. FIG. 5 is a cross-sectional view that illustrates a configuration of the multilayer body 20 in the multilayer ceramic electronic component 10 according to the first preferred embodiment of the present invention.

As illustrated in FIG. 5, the inner electrode layers 12 exposed at both end surfaces of the multilayer body 20 are united and integrated with each other. This united state can be obtained by supplying the conductive ink in an amount larger than that in the case illustrated in FIGS. 2A-2C and 3, forming the inner electrode layers 12 including redundant portions that extend over the thin portions in the vicinity of the first end portion in the ceramic layers 11, and uniting the thick portions in the inner electrode layers 12 in both end surfaces of the multilayer body 20 in producing the multilayer body 20. As shown in FIG. 5, "redundant portion" means a connecting portion which connects between the thick portions located at base of the inner electrode layers 12 from which the inner electrode layers 12 extend. As clearly can be seen from FIG. 5, the redundant portions are provided to connect thick portions of the inner electrode layer 12 to be vertically united with each other.

Second Preferred Embodiment

A multilayer ceramic electronic component according to a second preferred embodiment of the present invention has a characteristic in that the ceramic layers 11 and the inner electrode layers 12 are formed by an inkjet technique. FIGS. 6A-6D are diagrams for describing a method for manufacturing the multilayer body 20 in the multilayer ceramic electronic component 10 according to the second preferred embodiment of the present invention. The same reference numerals are used in the elements similar to those in the first preferred embodiment, and the detailed description thereof is omitted.

Figure 6A:
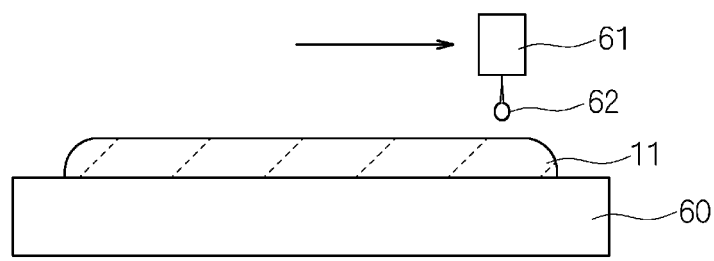
FIGS. 6A-6D are diagrams for describing a method for manufacturing a multilayer body in a multilayer ceramic electronic component according to a second preferred embodiment of the present invention.

As illustrated in FIGS. 6A-6D, the multilayer body 20 in the multilayer ceramic electronic component 10 according to the present second preferred embodiment is produced by alternately laminating the ceramic layers 11 and the inner electrode layers 12. First, as illustrated in FIG. 6A, ceramic ink 62 is discharged and applied on a substrate (base) 60 while an ink head 61 is moved in a first direction (direction indicated by the arrow), it is dried, and the ceramic layer 11 is thus formed. The ceramic layer 11 is formed such that it includes a thin portion whose thickness is continuously reduced by surface tension of the ceramic ink 62 in the vicinity of a first end portion. In FIG. 6A, the ceramic layer 11 includes thin portions in the vicinities of both end portions.

Figure 6B:
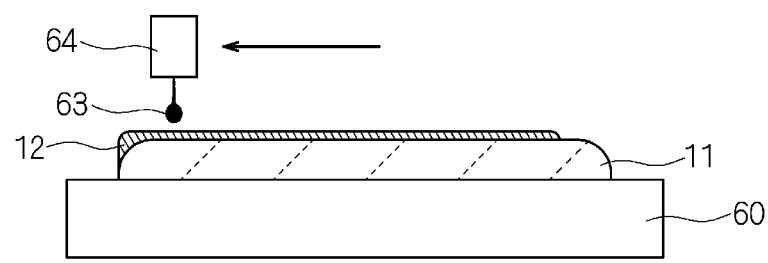

Next, as illustrated in FIG. 6B, conductive ink 63 is discharged and applied on the ceramic layer 11 while an ink head is moved in a direction opposite the first direction (direction indicated by the arrow), that is, in a direction opposite to the moving direction illustrated in FIG. 6A, and it is dried. Specifically, the inner electrode layer 12 having the shape illustrated in FIG. 3 is formed by using an increased amount of the conductive ink 63 discharged on the region in the vicinity of the first end portion including the thin portion in the ceramic layer 11 or by applying the conductive ink 63 on the region in the vicinity of the first end portion including the thin portion in the ceramic layer 11 multiple times. The movement of the ink head 61 and the ink head 64 in opposite directions illustrated in FIGS. 6A-6D may be replaced with movement of them in the same direction.

In a way similar to that illustrated in FIG. 6A, the ceramic ink 62 is discharged on the inner electrode layer 12 formed as illustrated in FIG. 6B while the ink head 61 is thus moved in the first direction, and the ceramic layer 11 is formed. The conductive ink 63 is applied only up to a position that does not reach the end portion in the ceramic layer 11 on a second end portion side in the inner electrode layer 12. Thus, the newly formed ceramic layer 11 is integrated with the previously formed ceramic layer 11 in the portion where the conductive ink 63 is not applied.

Figure 6C:
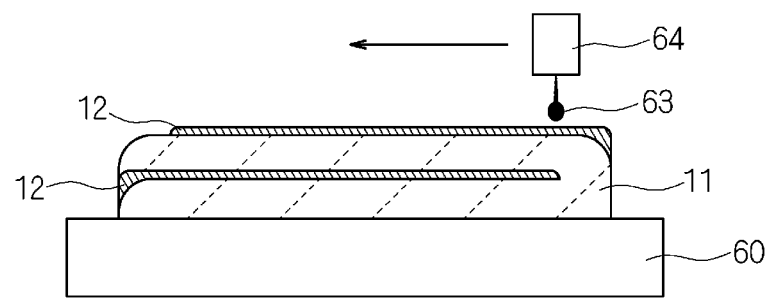

The ceramic layer 11 is formed such that it includes thin portions whose thicknesses are continuously reduced by surface tension of the ceramic ink 62. In addition, as illustrated in FIG. 6C, the conductive ink 63 is discharged and applied on the ceramic layer 11 while the ink head 64 is moved in the direction opposite the first direction (direction indicated by the arrow). In a way similar to that illustrated in FIG. 6B, another inner electrode layer 12 having the shape illustrated in FIG. 3 is formed by using an increased amount of the conductive ink 63 discharged on the region in the vicinity of a second end portion including the thin portion in the ceramic layer 11 or by applying the conductive ink 63 on the region in the vicinity of the second end portion including the thin portion in the ceramic layer 11 multiple times.

As illustrated in FIG. 4B, the shape of the thin portion located in the vicinity of the first end portion in the ceramic layer 11 and the position of the unexposed end portion in the inner electrode layer 12c in the multilayer ceramic electronic component 10 according to the present second preferred embodiment are also appropriately designed. That is, the distance D4 between the unexposed end portion in the inner electrode layer 12c and the adjacent inner electrode layer 12d is equal to or longer than the interlayer distance D3 between the inner electrode layers 12c and 12d. This reduces the occurrence of concentration of an electric field in the end portion 42 and also prevents the possibility of increasing the amount of electric discharge.

Figure 6D:
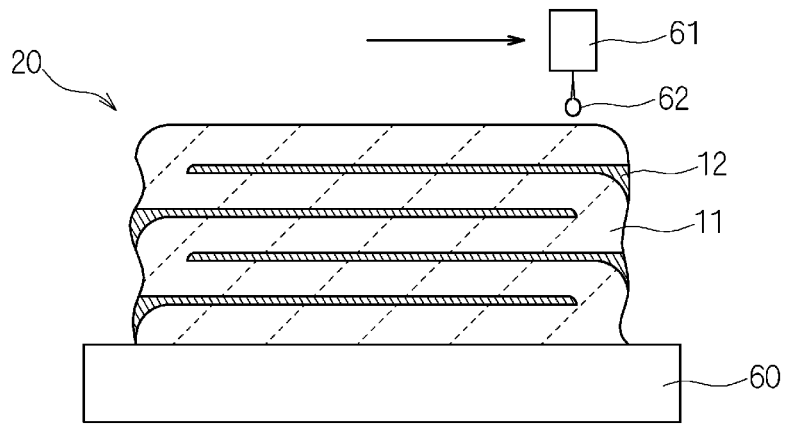
Figure 7:
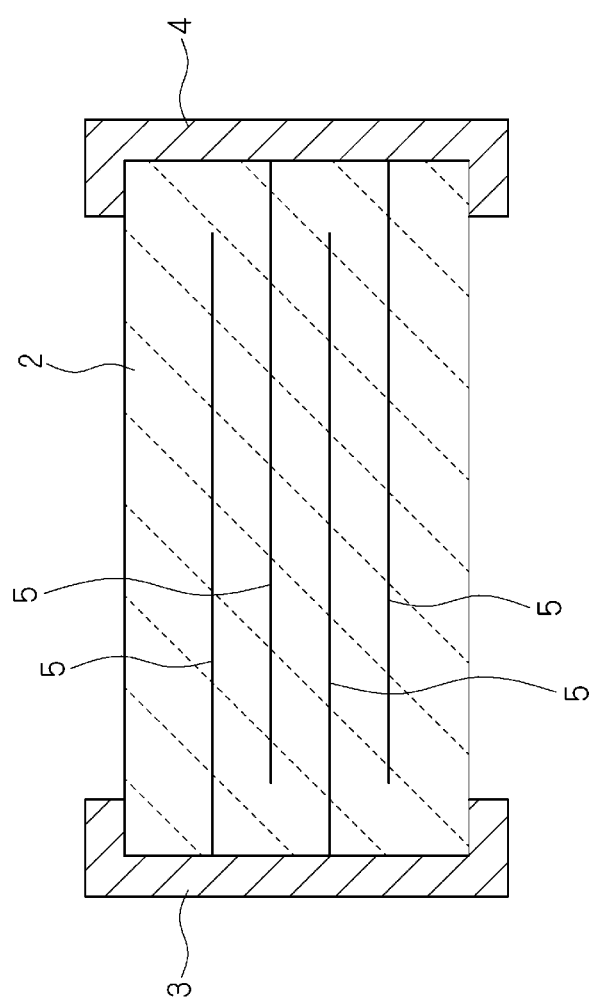
FIG. 7 is a cross-sectional view that schematically illustrates a configuration of a multilayer ceramic electronic component manufactured by a known manufacturing method.

By repeating the above-described steps, the multilayer body 20 in which the ceramic layers 11 and the inner electrode layers 12 are alternately laminated is formed, as illustrated in FIG. 6D. In the present second preferred embodiment, after one layer of the ceramic layer 11 including the thin portion is formed, the inner electrode layer 12 including the thick portion corresponding to the shape of the thin portion is formed. In particular, in the case of applying the ceramic ink 62 multiple times in order to increase the thickness of the ceramic layer 11, when the printing is performed up to a point before completion of the multiple times of applying the ceramic ink 62, the conductive ink 63 corresponding to the thick portion or a portion thereof may be applied.

The above-described preferred embodiments may be changed within the scope that does not deviate from the spirit of the present invention. For example, in the first and second preferred embodiments, the ceramic layers 11 and the inner electrode layers 12 are preferably laminated such that the exposed sides of the inner electrode layers 12 are arranged alternately (in opposite orientations). The multilayer body 20 may also be produced such that a set of a plurality of inner electrode layers 12 whose exposed portions are in one orientation and another set of a plurality of inner electrode layers 12 whose exposed portions are in another orientation are laminated alternately, for example, the inner electrode layers 12 may be laminated in an alternating manner in units of two or three layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic electronic component comprising:
a multilayer body in which a plurality of ceramic layers and a plurality of first and second inner electrode layers are laminated, the plurality of first and second inner electrode layers being disposed on a plurality of interfaces between the ceramic layers; and
first and second outer electrodes disposed on external surfaces of the multilayer body and electrically connected to first end portions of the first and second inner electrode layers, respectively, the first end portions being exposed to the external surfaces of the multilayer body; wherein
each of the ceramic layers includes a thin portion with a thickness in a vicinity of a respective one of the first end portions that continuously reduces toward the first end portion;
each of the first inner electrode layers includes a first thick portion connected to the first outer electrode in a vicinity of a connection portion with the first outer electrode, the first thick portion having a thickness that continuously increases toward the connection portion on a first side in accordance with a shape of the thin portion in the ceramic layer;
each of the second inner electrode layers includes a second thick portion connected to the second outer electrode in a vicinity of a connection portion with the second outer electrode, the second thick portion having a thickness that continuously increases toward the connection portion on a first side in accordance with a shape of the thin portion in the ceramic layer;
in each of the second inner electrode layers, a distance between a second end portion of the second inner electrode layer, the second end portion not being joined to the second outer electrode, and the first thick portion of the first inner electrode adjacent to the second end portion of the second inner electrode is equal to or longer than an interlayer distance between the first inner electrode layers and the second inner electrode layers; and in each of the first inner electrode layers, a distance between a second end portion of the first inner electrode layer, the second end portion not being joined to the first outer electrode, and the second thick portion of the second inner electrode adjacent to the second end portion of the first inner electrode is equal to or longer than an interlayer distance between the first inner electrode layers and the second inner electrode layers.

2. The multilayer ceramic electronic component according to claim 1, wherein the first and second outer electrodes are integral with the first and second inner electrode layers such that the thick portions exposed to the external surfaces of the multilayer body of the plurality of first and second inner electrode layers are united together.

3. The multilayer ceramic electronic component according to claim 1, wherein each of the ceramic layers includes two thin portions at end portions thereof.

4. The multilayer ceramic electronic component according to claim 1, wherein each of the ceramic layers is made of ceramic ink.

5. The multilayer ceramic electronic component according to claim 1, wherein each of the first and second inner electrode layers include redundant portions extending over the first end portions in the ceramic layer.

6. The multilayer ceramic electronic component according to claim 1, wherein each of the first and second inner electrode layers is made of conductive ink.

7. A method for manufacturing a multilayer ceramic electronic component, the multilayer ceramic electronic component including a multilayer body in which a plurality of ceramic layers and a plurality of first and second inner electrode layers are laminated, the plurality of first and second inner electrode layers being disposed on a plurality of interfaces between the ceramic layers, and first and second outer electrodes disposed on external surfaces of the multilayer body and electrically connected to first end portions of the first and second inner electrode layers, respectively, the first end portions being exposed to the external surfaces of the multilayer body, the method comprising:

a step of forming each of the ceramic layers such that the ceramic layer includes a thin portion with a thickness in a vicinity of a respective one of the first end portions that continuously reduces toward the first end portion;

a step of forming each of the first and second inner electrode layers on the ceramic layers such that each of the first inner electrode layers includes a first thick portion that covers the thin portion, which is formed in the vicinity of the respective one of the first end portions, in the ceramic layers and that has a thickness continuously increasing on a first side in accordance with a shape of the thin portion, and each of the second inner electrode layers includes a second thick portion that covers the thin portion, which is formed in the vicinity of the respective one of the first end portions, in the ceramic layers and that has a thickness continuously increasing on a first side in accordance with a shape of the thin portion;

a step of producing the multilayer body by alternately laminating the ceramic layers and the first and second inner electrode layers such that the first and second thick portions of the first and second inner electrode layers are exposed to the external surfaces, a distance between a second end portion of each of the second inner electrode layers and the first thick portion of the first inner electrode adjacent to the second end portion of the second inner electrode layer is equal to or longer than an interlayer distance between the first inner electrode layers and the second inner electrode layers, and a distance between a second end portion of each of the first inner electrode layers and the second thick portion of the second inner electrode adjacent to the second end portion of the first inner electrode is equal to or longer than an interlayer distance between the first inner electrode layers and the second inner electrode layers; and a step of forming the first and second outer electrodes to be electrically connected to the thick portions of the first and second inner electrode layers, the thick portions being exposed to the external surfaces of the multilayer body.

8. The method for manufacturing the multilayer ceramic electronic component according to claim 7, wherein the first and second inner electrode layers including redundant portions extending over the first end portions in the ceramic layers are formed in the step of forming each of the first and second inner electrode layers;

the redundant portions of the first and second inner electrode layers are united together in the step of producing the multilayer body such that the thick portions of the plurality of first and second inner electrode layers are united together to form the first and second outer electrodes in the step of forming the first and second outer electrodes.

9. The method for manufacturing the multilayer ceramic electronic component according to claim 7, wherein the ceramic layers and the first and second inner electrode layers are formed by an inkjet technique.

10. The method for manufacturing the multilayer ceramic electronic component according to claim 7, wherein the first and second outer electrodes are integral with the first and second inner electrode layers such that the first and second thick portions exposed to the external surfaces of the multilayer body of the plurality of first and second inner electrode layers are united together.

11. The method for manufacturing the multilayer ceramic electronic component according to claim 7, wherein each of the ceramic layers includes two thin portions at end portions thereof.

12. The method for manufacturing the multilayer ceramic electronic component according to claim 7, wherein each of the ceramic layers is made of ceramic ink.

13. The method for manufacturing the multilayer ceramic electronic component according to claim 7, wherein each of the first and second inner electrode layers include redundant portions extending over the first end portions in the ceramic layers.

14. The method for manufacturing the multilayer ceramic electronic component according to claim 7, wherein each of the first and second inner electrode layers is made of conductive ink.

* * * * *